(12) United States Patent
Burton

(10) Patent No.: US 6,808,145 B2
(45) Date of Patent: Oct. 26, 2004

(54) DUAL-MODE AIRBREATHING PROPULSION SYSTEM

(75) Inventor: Rodney L. Burton, Champaign, IL (US)

(73) Assignee: CU Aerospace, Urbana, IL (US)

( * ) Notice: Subject to any disclaimer, the term of this patent is extended or adjusted under 35 U.S.C. 154(b) by 33 days.

(21) Appl. No.: 10/360,672

(22) Filed: Feb. 7, 2003

(65) Prior Publication Data

US 2004/0026572 A1 Feb. 12, 2004

Related U.S. Application Data

(60) Provisional application No. 60/355,746, filed on Feb. 8, 2002.

(51) Int. Cl.[7] .................................................. F03H 5/00
(52) U.S. Cl. ........................... 244/172; 244/59; 244/62; 60/225
(58) Field of Search ........................... 244/172, 61, 57, 244/62, 2; 60/204, 257, 266, 267, 225, 224, 39.465

(56) References Cited

U.S. PATENT DOCUMENTS 3,691,769 A * 9/1972 Keilbach et al. .............. 60/217
3,756,024 A * 9/1973 Gay ............................. 60/204
3,768,254 A * 10/1973 Stuart ........................... 60/204
4,754,601 A * 7/1988 Minovitch .................... 60/204
5,154,051 A * 10/1992 Mouritzen .................... 60/257

* cited by examiner

Primary Examiner—Peter M. Poon
Assistant Examiner—Timothy D. Collins
(74) Attorney, Agent, or Firm—Adam K. Sacharoff

(57) ABSTRACT

The present invention includes a method for a dual-mode propulsion system. During the first mode of operation, intake air is liquefied through a cooling heat exchanger and condenser using a combination of stored liquid hydrogen ($LH_2$) and stored liquid nitrogen ($LN_2$) as coolants. The liquefied air is then separated into separated liquid oxygen ($^SLO_2$) and separated liquid nitrogen ($^SLN_2$), which may contain molecules of each other or other elements commonly found in air. The stored liquid nitrogen is replaced with $^SLO_2$, while the $^SLN_2$ is pumped back through the system with the stored nitrogen in a regeneration process. The $^SLN_2$, $LN_2$, and $LH_2$ become gaseous as they pass through the condenser and heat exchanger and are burned in the dual mode rocket thrust chamber to produce thrust. In the second mode, the same thrust chamber is operated as a liquid hydrogen-oxygen rocket, where the liquid oxygen is the $^SLO_2$ collected during the first mode.

17 Claims, 3 Drawing Sheets

DUAL-MODE AIRBREATHING PROPULSION SYSTEM

RELATED APPLICATIONS

The present invention claims priority to provisional application Ser. No. 60/355,746, filed on Feb. 8, 2002.

FIELD OF THE INVENTION

The present invention relates to airplanes and more particularly to a new aerospace plane system, forming the basis for a revolutionary transportation architecture for both point-to-point travel on Earth and access into space with a single vehicle, either manned or unmanned.

BACKGROUND OF THE INVENTION

The use of liquid hydrogen to condense air has been previously explored. It was first proposed in the 1950s and termed the LACE/separation approach. This approach was further investigated by the Air Force during the early 1960s and by United States Air Force Defense Advanced Research Projects Agency (DARPA/AF) during the National Aerospace Plane (NASP X-30) program in the 1980s–1990s.

There exist many important distinguishing features and advantages of the present invention over the prior art. First, the use of liquid nitrogen ($LN_2$) as a coolant and propellant, as a propellant, $LN_2$ greatly increases propellant density and reduces vehicle volume to achieve a lower drag vehicle, as compared to prior art $H_2$-fueled concepts. Second, combining airbreathing storable oxidizer and a dual-mode rocket engine provides a high $I_{sp}$ (specific impulse) with a high throttleable thrust in a single combustion chamber. Third, liquid pumping instead of an air standard cycle or Brayton cycle minimizes propellant pumping power. Fourth, a minimal airframe/propulsion integration allows for the development of the propulsion system separate from development of the vehicle. Fifth, the present invention can switch between endoatmospheric and exoatmospheric flight at high $I_{sp}$ to allow global reach trajectories which leave the atmosphere or go into orbit. Next, the present invention permits use of rocket propulsion for braking during reentry, reducing weight of the thermal protection system; Lastly, the mass of the present invention slowly decreases during collection allowing flight at a near-constant angle of attack.

SUMMARY OF THE INVENTION

The present invention finds application in many commercial, military, and scientific aerospace areas. The concept of the present invention is a dual-mode single stage to orbit propulsion system. Based on the rocket engine but coupled with in-flight air collection, liquefaction, and separation, the proposed system represents a unique combination of existing technologies into a system of vastly improved performance.

During the first airbreathing mode of operation, intake air is initially liquefied in a heat exchanger and condenser using a combination of stored liquid hydrogen ($LH_2$) and stored liquid nitrogen ($LN_2$) as coolants. The liquefied air is then separated into separated liquid oxygen ($^SLO_2$) and separated liquid nitrogen ($^SLN_2$). It is important to note (and as stated in greater detail below) that while it would be desirous to have perfect separation of the air, it is possible that both $^SLO_2$ and $^SLN_2$ contain molecules of oxygen and nitrogen as well as other some or all of the other constituents of air. The stored liquid nitrogen is used for cooling and propulsion and is replaced with $^SLO_2$, while the $^SLN_2$ is pumped back through the heat exchanger and condenser with the stored nitrogen (in what is termed herein as a regeneration process). The $^SLN_2$, $LN_2$, and $LH_2$ become gaseous as they passes through the condenser and heat exchanger and are burned in the dual-mode rocket thrust chamber, producing a relatively high thrust and specific impulse. In the second rocket mode, the same thrust chamber is operated as a liquid hydrogen-oxygen rocket, where the liquid oxygen is the $^SLO_2$ collected during the first mode.

This system results in a vehicle with a hydrogen-fueled propulsion system that permits takeoff from a runway to any point in less than 2 hours, including circumnavigation or Earth orbit. The development cost of this system is expected to be significantly less than that of the space shuttle. Furthermore, the system has a large potential for continuous improvement in system performance through economical ground-based development and testing of the propulsion subcomponents. The small size and low cost of the propulsion system in accordance with the present invention encourages large fleet size and high flight rate, leading to low operating costs.

Numerous advantages and features of the invention will become readily apparent from the following detailed description of the invention and the embodiments thereof, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1:
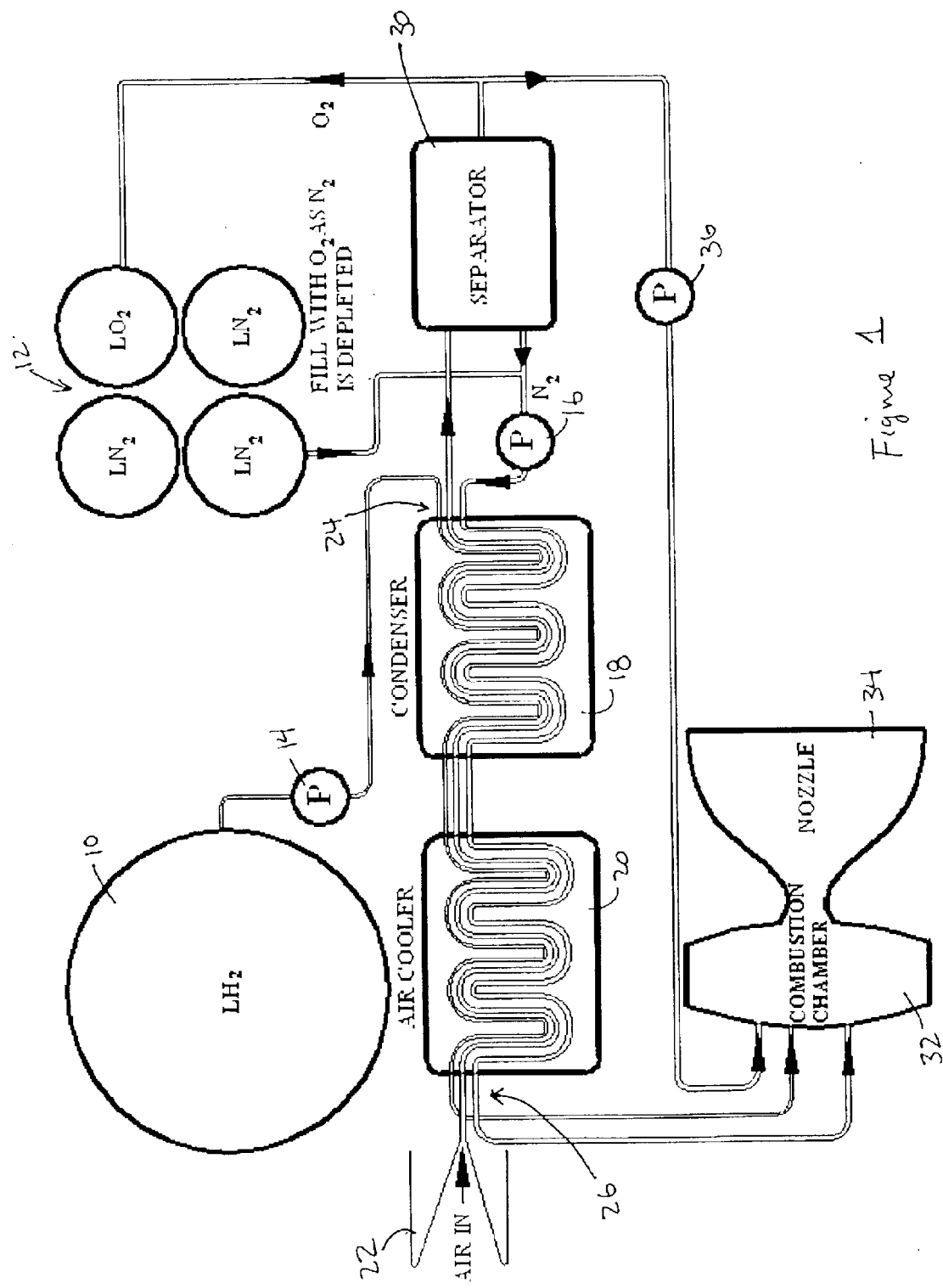
FIG. 1 is a block diagram of the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

The present invention relates to a dual-mode hydrogen-fueled propulsion system for a vehicle that can be a single stage to orbit (SSTO) vehicle. During the first mode air is collected and preferably separated into separated oxygen and separated nitrogen. The separated oxygen is stored and used in the second mode, while the separated nitrogen is burned along with stored nitrogen and stored hydrogen in a rocket combustion chamber. In the second mode and as the vehicle reaches orbit, air is no longer collected and the stored oxygen and stored hydrogen are burned in the same rocket combustion chamber.

Figure 2:
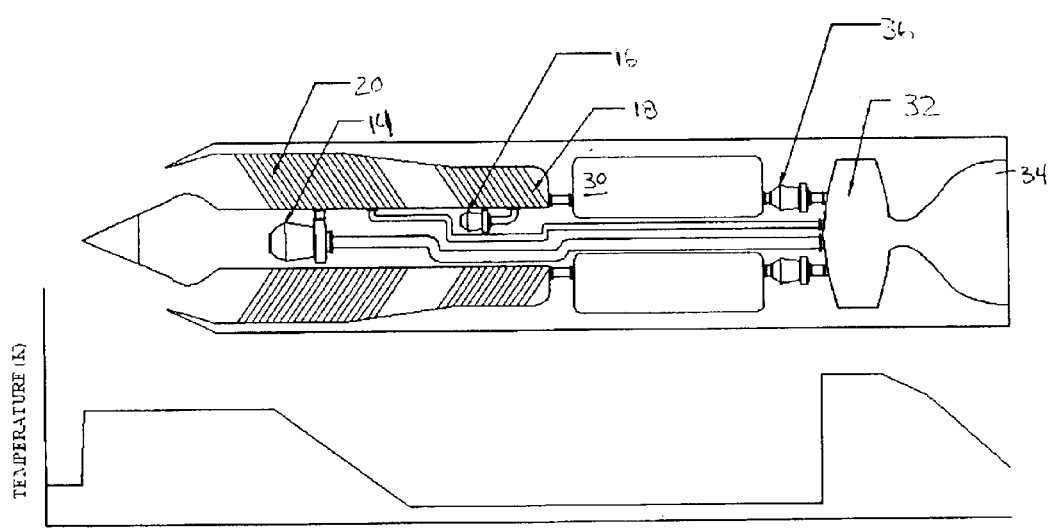
FIG. 2 is a engine layout schematic in accordance with the present invention along with a temperature profile through the system.

Referring now to FIG. 1 and FIG. 2, where FIG. 1 is a block diagram schematic of the present invention and FIG. 2 is an engine layout schematic and a temperature gradient across the engine. The present invention includes a first tank 10 of liquid hydrogen ($LH_2$) and a plurality of second tanks 12 of liquid nitrogen ($LN_2$). The liquid hydrogen and liquid nitrogen are separately pumped (by a hydrogen pump 14 and a nitrogen pump 16, respectively) through a condenser 18 and a heat exchanger 20 (or gas cooler). At the same time, air enters the system through a collector inlet 22 and is reversely passed in counter flow fashion through the heat exchanger 20 and the condenser 18. During this process the air is cooled by the liquid hydrogen and liquid nitrogen such that it becomes liquefied when it exits the condenser at point 24. In addition, the air heats the liquid hydrogen and liquid nitrogen such that the hydrogen and nitrogen become gaseous when they exit the heat exchanger 20 at point 26. The flow rates of the hydrogen and nitrogen are adjusted relative to that of the air such that at all locations in the heat exchanger and condenser, for all flight conditions of speed and altitude, the fluid temperature of the hydrogen and nitrogen is always lower than the temperature of the air, thereby avoiding what is referred to as the "pinch point" problem.

The condensed air enters a separator 30 that separates the oxygen and the nitrogen, creating separated liquid oxygen ($^SLO_2$) and separated liquid nitrogen ($^SLN_2$). While in a perfect system there is complete separation of the oxygen and nitrogen, in actuality both the separated liquid oxygen and the separated liquid nitrogen may contain some molecules of the other as well as some or all of the molecules of the remaining minor elements of air, e.g., argon. A portion of the separated liquid oxygen is stored in the second tanks 12 as the liquid nitrogen is depleted. An additional benefit of the present invention is since oxygen is denser than nitrogen the second tanks 12 are capable of storing more oxygen than nitrogen in the same volume tank. This provides the ability for increased burn times during the second mode of the invention. The remaining portion of the separated liquid oxygen is pumped towards a combustion chamber 32 via an oxygen pump 36 to be burned during the first mode.

The separated liquid nitrogen is pumped by the nitrogen pump 16 along with the stored liquid nitrogen to high pressure into the condenser 16 providing regenerative cooling. The regenerative cooling process is provided in that the separated liquid nitrogen, which is actually a portion of the intake air, is used to cool the air as the process continues.

During the first mode and within the atmosphere, air is collected and the heated hydrogen and the heated nitrogen mix with separated nitrogen and are burned in the rocket combustion chamber 32, producing an exhaust velocity of ~3000 m/s and a relatively high thrust. If desired, the thrust can be throttled by passing some or all of the heated nitrogen and dumping it overboard, or increased by increasing the propellant flow rates, as by the use of higher chamber pressure or multiple combustion chambers.

In addition, since oxygen is burned during the first mode it is conceivable to have a small tank of liquid oxygen (referred herein as initial liquid oxygen or $^ILO_2$) amongst the other secondary tanks of liquid nitrogen. The $^ILO_2$ may then be pumped through the exchanger/cooler with the liquid nitrogen, meaning gaseous oxygen is burned initially. Once air enters the intake and $^SLO_2$ is produced, the $^ILO_2$ may be replaced with a portion of the $^SLO_2$. Alternatively, before takeoff, if liquid hydrogen is run through the heat exchanger/condenser, the cooled air sitting in the heat exchanger/condenser drops to a low pressure, allowing outside air pressure to push a flow of air into the heat exchanger/condenser, thus setting up a flow of liquefied air despite having zero vehicle velocity. This liquefied air can then be combined with the hydrogen to produce takeoff thrust. Flying forward accentuates this effect, allowing the vehicle to take off with zero initial liquid oxygen.

During the second mode and in order to leave the atmosphere, i.e. to achieve orbit or enter an intercontinental ballistic trajectory, the combustion chamber 32 is used as a liquid hydrogen-oxygen rocket similar to one of the space shuttle main engines, only 30–50% the size, with an exhaust velocity of ~4500 m/s. The liquid hydrogen and the stored separated liquid oxygen are pumped through the condenser 18 and heat exchanger 20 and into the combustion chamber 32. In addition, since air inlet 22 is no longer intaking air, the heat exchanger 20 and condenser 18 are not functioning to heat the liquid hydrogen or the stored separated liquid oxygen, such that they may be injected and mixed in the combustion chamber 32 as in a typical hydrogen-oxygen rocket. While in the second mode it is preferred to pump the stored separated liquid oxygen and the liquid hydrogen through the heat exchanger and condenser, valves and bypass lines may be appropriately used to bypass the heat exchanger and condenser. It is also conceived to pre-store some pure liquid oxygen such that the second mode may operate at any time, prior to collecting and storing the separated liquid oxygen.

Advantages of the present invention over turbine engines can be seen because all pumping is performed on the liquid phase, the pumping power is relatively low, with the fuel needed to operate the pumps reducing the specific impulse by less than 1%. Unlike the space shuttle main engines, stored oxygen is not required. Like conventional hydrogen-oxygen rockets, the hydrogen is used to cool the wall of the rocket and while the block diagram of FIG. 1 may show the hydrogen entering at the entrance of the combustion chamber, the hydrogen would be directed into the combustion chamber 32 and nozzle 34 as in the prior art.

The vehicle utilizing the present invention accelerates on a conventional runway and climbs to a supersonic condition at altitude, using an initial small oxygen store. Air collection, liquefaction, and separation occur at a cruise or accelerating condition, with a fraction of the collected oxygen used to provide thrust, needed to overcome acceleration force plus aerodynamic drag plus drag incurred by the collection process. Collection takes 20–60 minutes, after which the vehicle closes the inlet and accelerates into a pull-up maneuver to escape the atmosphere at a high Mach number. The system then switches to pure rocket thrust using stored propellant for acceleration to maximum velocity. Following ballistic coast the vehicle re-enters and reverts either to a glide, to a collection mode again, or remains on rocket power for landing. Note that this profile provides several safe abort modes during the flight in that the aerodynamic L/D and system weight are such that landing can be achieved on any runway at any time.

Figure 3:
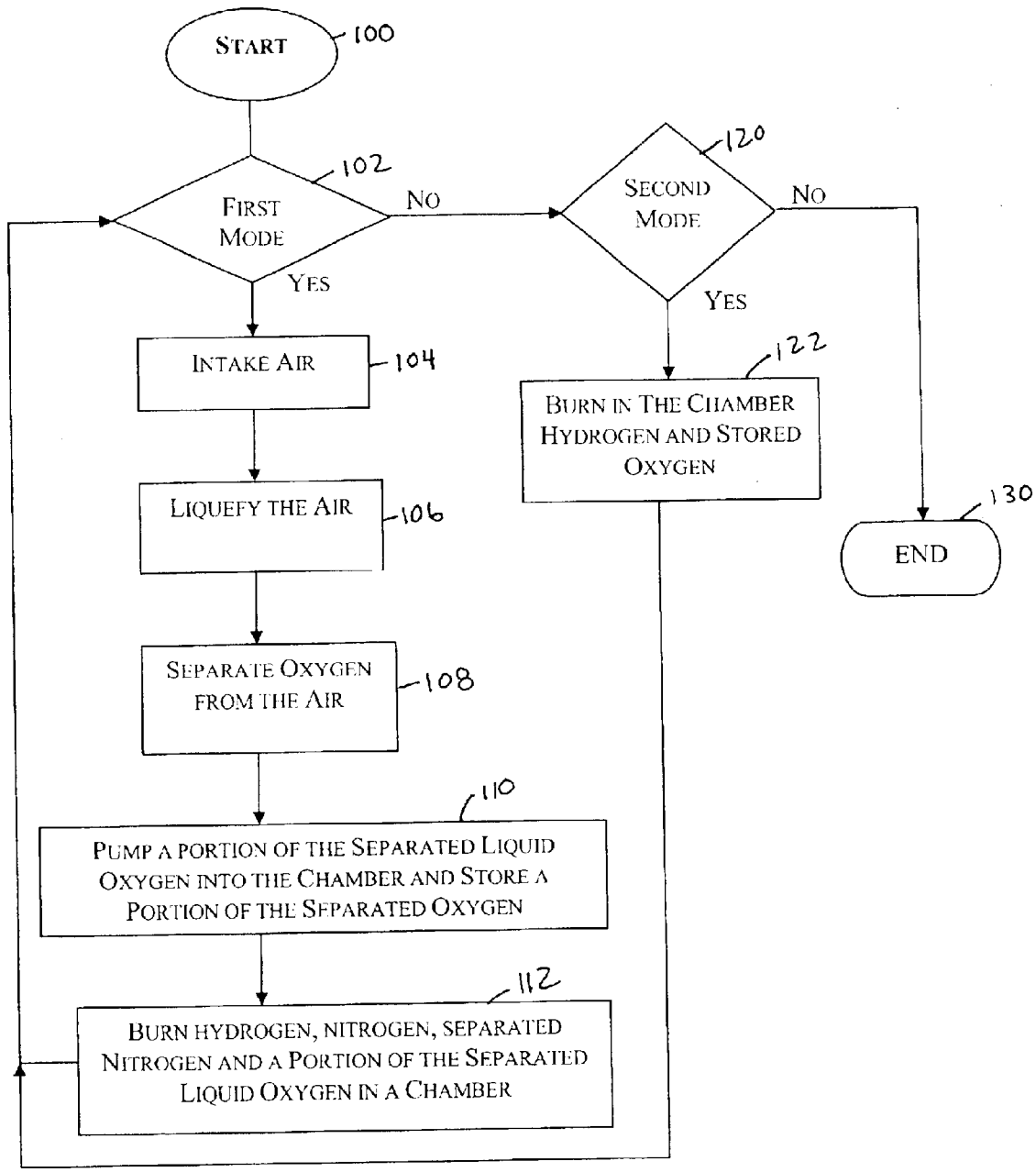
FIG. 3 is a block diagram describing one embodiment of the present invention.

Referring now to FIG. 3, in one embodiment of the present invention, a method of providing a dual-mode air-breathing propulsion system is diagramed. The method begins, 100, with the determination of whether the system is in a First mode, step 102. If the system is in the first mode, air is collected through an intake 22, Step 104, and liquefied, Step 106, through a heat exchanger 20 and condenser 18 (FIG. 1). Oxygen is then separated out of the liquefied air in Step 108 and a portion of the separated liquid oxygen is stored, Step 110, preferably in tanks 12. The other portion is allowed to flow into the chamber for use in the first mode. Hydrogen, Nitrogen, the remaining liquefied air (excluding the separated liquid oxygen) and a portion of the liquid oxygen is burned in a chamber 32 to produce thrust, Step 112. This process is repeated while in the first mode. If the system is not in the first mode, then it is determined if the system is in the second mode, Step 120. During the second mode, hydrogen and the stored separated oxygen is burned in the same chamber, Step 122. This process is similarly repeated. When however, the system is not operating in the first or second modes, Steps 102 and 120, the system may end, Step 130.

The following is for exemplary purposes only and does not act to limit the scope of the invention. The simplest mission is a single-stage boost to maximum velocity on a ballistic trajectory, followed by a Shuttle Orbiter-like glide to a landing. A series of first-order calculations will now illustrate the general concept. Consider a vehicle with a takeoff mass of 95,000 kg at Mach 1.5 cruise with the Dual-Mode Engine of the present invention, which may be about the size of a Boeing 757 aircraft. The takeoff propellant mass is assumed to be 80,000 kg. It is also assumed that for all conditions the oxygen/fuel ratio is 6:1, and for simplicity that air is composed of 79% $N_2$ and 21% $O_2$ by weight. An equilibrium code (TEP) is used to predict rocket performance, which is ~470 seconds specific impulse for $H_2$—$O_2$ and ~250 seconds for $H_2$—$O_2$—$N_2$. Some properties of the system cryogenic chemicals are shown in Table 1.

TABLE 1

Properties of the cryogenic system chemicals.

| | hydrogen | nitrogen | oxygen | air |
|---|---|---|---|---|
| density of liquid, kg/m³ | 71 | 808 | 1140 | 878 |
| heat of vaporization, J/kg | 446000 | 199000 | 213000 | 202000 |
| specific heat of gas, J/kg-K | 14550 | 1039 | 909 | 1003 |
| Boiling point at 1 atm., K | 20 | 77 | 90 | 80 |

All fluids in the inlet heat exchanger 18 are in the gaseous state. It is assumed here that the driving potential $\Delta T$ between counter-flowing gases at the entrance is 40 K, and that the air inlet temperature is 470 K and the fluid discharge temperature is 430 K. (Note that to first order the system is insensitive to flight Mach number, because adiabatically-heated inlet air raises the inlet temperature with higher Mach number, but also the discharge temperature of the $H_2$—$N_2$ cooling fluids.) The air is cooled and condensed at 80 K, and the hydrogen and nitrogen boil completely in the condenser, avoiding the classic heat exchanger "pinch point" problem, in which temperature difference between two fluids approaches zero and no heat can be transferred.

The thermodynamic energy balance give values shown in Table 2 for 1 kg of collected air. Note in Table 2 that an additional mass of $N_2$ (0.98−0.79=0.19 kg) has been pumped out of the storage tank to supplement the air cooling, and that the total $N_2$ mass (0.98 kg) is 58 times that of the $H_2$, distinguishing this concept from all other previous air-cooling propulsion concepts.

TABLE 2

Thermodynamic energy balance for system.

| Mass of collected air, kg | 1.00 |
|---|---|
| Mass of collected oxygen, kg | 0.21 |
| Mass of collected nitrogen, kg | 0.79 |
| Mass of heated hydrogen, kg | 0.0169 |
| Mass of heated nitrogen, kg | 0.98 |
| Additional $N_2$ for condensation | 0.19 |
| Cooled $O_2$ per kg of $H_2$, kg | 12.4 |

We now discuss the design point in terms of oxidizer to fuel ratios, for an assumed 1 kg of $H_2$ burned in the first mode. Because the second propulsion mode also burns $O_2$—$H_2$ at a 6:1 ratio, and 12.4 kg $O_2$ are collected per kg of $H_2$ with 6.0 kg of $O_2$ burned in the first mode (leaving 6.4 kg for storage), an additional (12.4−6)/6.0=1.07 kg of second-mode $H_2$ is required per kg used in the first mode, totaling 2.07 kg of $H_2$. Because an additional 0.19 kg $N_2$ is needed to condense 0.21 kg of $O_2$, 11.1 kg of $N_2$ are also needed. The initial $H_2$ propellant fraction is therefore 2.07/(2.07+11.1)=0.158, giving the following masses shown in Table 3:

TABLE 3

$H_2/O_2/N_2$ design point mass table.

| | Takeoff | Staging | Glide |
|---|---|---|---|
| Initial | 95000 kg | 60500 kg | 15000 kg |
| Dry mass | 15000 kg | 15000 kg | 15000 kg |
| Liquid $H_2$ | 12600 kg, 178 m³ | 6500 kg | 0 |
| Liquid $N_2$ | 67400 kg, 83 m³ | 0 | 0 |
| Liquid $O_2$ | 0 | 39000 kg, 34 m³ | 0 |
| Mean Density $\rho_{ppl}$ | 310 kg/m³ | | |

Note that the collected $O_2$ (34 m³) has no difficulty fitting into the second tanks 12 vacated by the depleted $N_2$ (83 m³). Also note that the mass of the vehicle at staging, when the system converts to pure rocket mode, is 35% smaller than the takeoff mass, providing decreasing angle of attack and aerodynamic drag during collection. The average propellant fuel density $\rho_{ppl}$ is relatively high, 4.4 times that of $LH_2$, which reduces vehicle volume and increases the lift to drag ratio. The specific impulse of the second stage is 470 sec, giving a $\Delta V$ for this design point:

$$\Delta V = g_o I_{sp2} \ln(m_o/m_f) = 9.81 \cdot 470 \cdot \ln(605000/15000) = 6.4 \text{km/s} \quad (1)$$

A value close to that required to reach orbit from the high altitude and Mach number of staging, and sufficient for a global circumnavigation. The total time required for circumnavigation would be 120–180 minutes, depending on the glide time.

The thrust during the collection phase must be sufficient to overcome aerodynamic drag and the drag due to collection. The aerodynamic drag can be written as $D_{aero} = m_o g_o/(L/D)$. For the design point, the assumed lift/drag ratio is L/D~11.5, giving $D_{aero}$=81000−53000 N [18000−12000 lbs] as mass decreases during collection. At $M_o$=1.5, assuming a 60 minute collection phase for 75600 kg of $O_2$, 360000 kg of air are collected, or 100 kg air/sec. The collection drag is then estimated as $D_{coll}=(dm/dt)_{air} M_o a_o$=47000 N [10600 lbs]. Maximum total cruise-collection thrust is therefore 128000 N, and the hydrogen mass flow rate is 1.69 kg/s, during which the vehicle cruises 1700 km [1060 miles].

The specific impulse $I_{sp1}$ of the airbreathing first stage mode is calculated from:

$$I_{sp1} = \frac{\text{(mass flow rate through engine)}}{\text{(mass flow rate from onboard tanks)}} \text{(calculated air rocked } I_{sp}) \quad (2)$$

Because the engine mass flow rate is 5.4 times the mass flow rate of onboard $H_2$ and $N_2$ stored in the tanks, the effective $I_{sp1}$=1340 seconds. This value is reduced slightly by the propellant required to run the pumps. During cruise the fluid pumping power is given in Table 4;

TABLE 4

Pumping power requirements for design point.

| Fluid | pressure rise, atm | mass flow rate, kg/s | fluid power, kW |
|---|---|---|---|
| hydrogen | ~80 | 1.69 | 190 |
| nitrogen | ~80 | 47.2 | 467 |
| oxygen | ~80 | 10.1 | 71 |
| | | Total Power | 728 |

Assuming for this example, that the pumps are 60% efficient and powered by a conventional hydrocarbon-fueled gas turbine with a brake specific fuel consumption (BSFC) of 0.35 pounds fuel/shaft HP-hour, the pump fuel requirement (425 lbs/hr) reduces the $I_{sp1}$ by only about 0.1% to 1338 seconds. Power required to run the liquid air separator is also estimated to be small.

The thrust during the second stage of acceleration to ballistic velocity is higher than during first mode cruise, achieving an initial acceleration on the order of 1.0 gee, or a thrust T~700,000 N [160000 lbs]. At this level the thrust time is 6 minutes and the maximum acceleration is 4.8 gee. For passenger comfort thrust throttling will be necessary to reduce gee load, extending thrust time.

For $LO_2$—$LH_2$ engines, cooling is accomplished by ducting $LH_2$ through coolant tubes forming the nozzle and throat (for simplicity, not shown in FIG. 1). This same approach would be used during the second stage, as the $LH_2$ is no longer needed for air collection. During the first stage the cruise thrust of 128000 N corresponds to a thermal power of ~207 MW, and an estimated 3% chamber cooling power would correspond to 6200 kW. One source of this amount of cooling would be the liquid oxygen, which at cruise has an available thermal power of >6000 kW, depending on injection temperature into the combustion chamber.

For a larger vehicle with orbit transfer as the primary mission, two stages may be optimum. The primary impact on the propulsion system is that the oxygen is collected in the First stage vehicle, and pumped across and stored in a Second stage that is piggybacked thereto. A two-stage vehicle may provide more payload fraction than a single stage.

Current compact heat exchangers, for example a folded-fin heat exchanger, provide heat transfer areas on the order of 2000 m$^2$ per cubic meter of volume, with a gas-to-gas conductance on the order of 250 W/(m$^2$K), and a density of ~250 kg/m$^3$. For the point design, the thermal power of the gas cooler heat exchanger at 100 kg air/sec is 37 MW. Thus, such a gas cooler heat exchanger, operating with a driving potential of 60 K will require ~2500 m$^2$ of heat transfer area, with a volume on the order of 1.3 m$^3$, and a weight of up ~300 kg. Newly-developed condenser/heat exchangers may operate with much higher conductance and may be significantly smaller.

In addition, a cycle involving hydrocarbons such as kerosene or liquid methane fuels may also be used coupled with mechanical refrigeration. These fuels, because of their lower $I_{sp}$, would limit the final velocities depending on the choice of system concept, but could possibly offer greater simplicity and lower development costs.

Various separators may also be used by the present invention, including fractional distillation, molecular sieve, centrifugal rotary, vortex tube, and magnetic.

The present invention finds applicability in various commercial, military, and scientific fields. For example, in commercial industry: satellite insertion, suborbital tourism, hypersonic FedEx, space station resupply, high-altitude imagery, or business jets; in the military: reconnaissance, personnel transport, missile defense (attack re-entering warheads from behind), weapons platform, anti-satellite launchers, and space assets replacement; and in scientific research: upper-atmosphere research, astronomy, and weightless environment.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

I claim:

1. A method for a dual-mode aerospace vehicle propulsion system comprising:

separately storing liquid hydrogen and liquid nitrogen;

during a first mode:
intaking air from atmosphere;
liquefying said air;
separating said liquefied air into separated liquid oxygen and separated liquid nitrogen;
storing a portion of said separated liquid oxygen and pumping a remaining portion of said separated liquid oxygen into a combustion chamber;
pumping liquid hydrogen, liquid nitrogen, and separated liquid nitrogen, and heating said liquid hydrogen, liquid nitrogen, and separated liquid nitrogen to their gaseous states; and
burning said gaseous hydrogen, nitrogen, separated nitrogen and said remaining portion of said separated liquid oxygen in said combustion chamber to produce thrust; and during a second mode:
pumping hydrogen and stored separated oxygen into said chamber; and
burning said pumped hydrogen and stored separated oxygen in said combustion chamber to produce thrust.

2. The method of claim 1, wherein the liquid hydrogen, liquid nitrogen, and separated liquid nitrogen are pumped through a heat exchange cooler and condenser to liquefy the air and the air is used to heat the hydrogen, liquid nitrogen and separated liquid nitrogen to their gaseous states.

3. The method of claim 2, wherein the step of storing the separated liquid oxygen includes storing the separated liquid oxygen in a tank initially storing liquid nitrogen.

4. A system for providing a dual-mode propulsion system comprising:

at least one tank of liquid hydrogen;
a plurality of second tanks of liquid nitrogen;
a combustion chamber and nozzle assembly;
a plurality of pumps;
a first mode of operation including:
a collector inlet to intake air from atmosphere;
a cooler heat exchanger and a condenser to liquefy the air;
a separator to separate liquid oxygen and liquid nitrogen from the air to define separated liquid oxygen and separated liquid nitrogen, a portion of the separated liquid oxygen is stored and a remaining portion of the separated liquid oxygen is allowed to flow into said combustion chamber; and
the plurality of pumps to pressurize and pump the liquid hydrogen, the liquid nitrogen, and the regenerative coolant separated liquid nitrogen, collectively fluids, through the condenser and the heat exchanger, such that the fluids aid in liquefying the air and air aids in heating the fluids to their gaseous states, and the gaseous fluids are further allowed to flow into said combustion chamber and nozzle assembly where the fluids and said remaining portion of separated liquid oxygen are burned to create thrust; and a second mode of operating including:
the plurality of pumps to pressurize and pump the liquid hydrogen and the stored separated liquid oxygen into said combustion chamber and nozzle assembly where the liquid hydrogen and the stored separated liquid oxygen are burned to create thrust.

5. In a method of performing a first and second mode of propulsion, utilizing a single combustion chamber nozzle assembly, the method comprises:

burning at least gaseous hydrogen, gaseous nitrogen and liquid oxygen in the combustion chamber to produce thrust, defining a first mode of propulsion; and burning at least liquid hydrogen and liquid oxygen in the combustion chamber to produce thrust, defining a second mode of propulsion.

6. The method of claim 5 further comprising:

collecting air in the first mode of propulsion and separating liquid oxygen therefrom for which a portion of the separated liquid oxygen is burned in said first mode and the remaining portion of the separated liquid oxygen is burned in said second mode of propulsion.

7. The method of claim 6 further comprising storing liquid hydrogen for use in the first and second mode of propulsion.

8. The method of claim 7 further comprising storing liquid nitrogen for use in the first mode of propulsion.

9. The method of claim 8 further comprising pumping the stored liquid hydrogen and the stored liquid nitrogen through a condenser and heat exchanger to liquefy the collected air prior to separating liquid oxygen therefrom, and wherein the stored liquid hydrogen and stored liquid nitrogen becomes gaseous as a result of passing through the condenser and heat exchanger, and the gaseous hydrogen and gaseous nitrogen is used in the first mode of propulsion.

10. The method of claim 9 further comprising separating nitrogen from the liquefied air and mixing the separated liquid nitrogen with the stored liquid nitrogen prior to the step of pumping through a condenser and heat exchanger, thereby using the separated liquid nitrogen in regenerative fashion.

11. The method of claim 10 further comprising storing a portion of said separated liquid oxygen in tanks initially used to store the liquid nitrogen.

12. In a method of performing a first and second mode of propulsion, the method comprises:

collecting air during the first mode of propulsion and separating liquid oxygen from said air;

burning at least gaseous hydrogen, gaseous nitrogen and a portion of said separated liquid oxygen in a combustion chamber to produce thrust, defining the first mode of propulsion; and burning at least liquid hydrogen and a portion of said separated liquid oxygen in the combustion chamber to produce thrust, defining the second mode of propulsion.

13. The method of claim 12 further comprising storing liquid hydrogen for use in the first and second mode of propulsion.

14. The method of claim 13 further comprising storing liquid nitrogen for use in the first mode of propulsion.

15. The method of claim 14 further comprising pumping the stored liquid hydrogen and the stored liquid nitrogen through a condenser and heat exchanger to liquefy the collected air prior to separating liquid oxygen therefrom, and wherein the stored liquid hydrogen and stored liquid nitrogen becomes gaseous as a result of passing through the condenser and heat exchanger, and the gaseous hydrogen and gaseous nitrogen is used in the first mode of propulsion.

16. The method of claim 15 further comprising separating nitrogen from the liquefied air and mixing the separated liquid nitrogen with the stored liquid nitrogen prior to the step of pumping through a condenser and heat exchanger, thereby using the separated liquid nitrogen in regenerative fashion.

17. The method of claim 16 further comprising storing the separated liquid oxygen in tanks initially used to store the liquid nitrogen.

* * * * *